United States Patent
Lemieux

(10) Patent No.: US 6,807,178 B1
(45) Date of Patent: Oct. 19, 2004

(54) SESSION DISPATCHER AT A WIRELESS MULTIPLEXER INTERFACE

(75) Inventor: Yves Lemieux, Kirkland (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 783 days.

(21) Appl. No.: 09/584,241

(22) Filed: May 31, 2000

(51) Int. Cl.$^7$ .............................................. H04L 12/28
(52) U.S. Cl. .................... 370/395.2; 370/235; 370/252; 370/310.1; 709/230; 455/445; 379/201.01; 379/219
(58) Field of Search ................................ 370/235, 236, 370/238.1, 310.1, 314, 354, 395.1, 395.2, 395.21, 395.5, 395.51, 395.52, 395.53, 468, 541, 252, 253; 709/230, 235; 455/445, 450, 500, 509; 379/201.01, 219, 196, 199

(56) References Cited

U.S. PATENT DOCUMENTS

| | | | | |
|---|---|---|---|---|
| 5,490,138 | A | | 2/1996 | Niestegge et al. ............ 370/56 |
| 5,729,826 | A | * | 3/1998 | Gavrilovich ................ 455/11.1 |
| 6,073,163 | A | * | 6/2000 | Clark et al. .................. 709/203 |
| 6,163,844 | A | * | 12/2000 | Duncan et al. ............. 713/201 |
| 6,192,173 | B1 | * | 2/2001 | Solheim et al. .............. 385/24 |
| 6,374,303 | B1 | * | 4/2002 | Armitage et al. ............ 370/390 |
| 6,418,126 | B1 | * | 7/2002 | Gilmurray et al. ........ 370/310.1 |
| 6,452,942 | B1 | * | 9/2002 | Lemieux ..................... 370/468 |
| 6,597,689 | B1 | * | 7/2003 | Chiu et al. ................... 370/354 |
| 6,665,273 | B1 | * | 12/2003 | Goguen et al. ............. 370/252 |

FOREIGN PATENT DOCUMENTS

| | | | | |
|---|---|---|---|---|
| EP | 0 935 364 A2 | 8/1999 | ........... H04L/12/24 |
| WO | WO 93/07724 | 4/1993 | ............ H04Q/7/04 |
| WO | WO 95/24802 | 9/1995 | ............ H04Q/3/00 |
| WO | WO 98/58456 | 12/1998 | ........... H04B/1/707 |
| WO | WO 99/04534 | 1/1999 | ........... H04L/12/28 |
| WO | WO 99/51001 | 10/1999 | ........... H04L/12/56 |

OTHER PUBLICATIONS

International Search Report, PCT/SE01/01236, dated Dec. 19, 2001.

* cited by examiner

*Primary Examiner*—Dang Ton
*Assistant Examiner*—Shick Hom
(74) *Attorney, Agent, or Firm*—Jenkens & Gilchrist

(57) ABSTRACT

A wireless local loop communications system includes a digital subscriber line access multiplexer connected to a plurality of network terminals wherein each network terminal provides multi-session local loop access for user communications. A shared point to multi-point wireless communications link connects the digital subscriber line access multiplexer to the plurality of network terminals. Regulation of user and session access to the shared wireless communications link is effectuated by a session dispatcher functionality. That functionality utilizes a dispatcher at each network terminal that operates responsive to received commands to regulate user and session access to the shared wireless communications link. A proxy agent for the functionality at the access multiplexer operates responsive to configuration data to determine (a) which network terminal and (b) which sessions being handled thereby are to be granted access rights to the shared communications link and issue commands to the dispatcher to implement that determined allocation.

6 Claims, 3 Drawing Sheets

SESSION DISPATCHER AT A WIRELESS MULTIPLEXER INTERFACE

CROSS-REFERENCE TO RELATED APPLICATIONS

The present application for patent is related to previously filed, commonly owned application for patent Ser. No. 09/316,409, now issued under U.S. Pat. No. 6,452,942, entitled "System and Method for Providing Wireless Local Loop Access Using an Access Multiplexer" by Yves Lemieux filed May 20, 1999, the disclosure of which is hereby incorporated by reference.

BACKGROUND OF THE INVENTION

1. Technical Field of the Invention

The present invention relates to a multi-user communications system and, in particular, to an operation for managing multi-user, multi-session access to a shared communications link.

2. Description of Related Art

Reference is now made to FIG. 1 wherein there is shown a functional block diagram of a wireless local loop arrangement 100 using a wireless Digital Subscriber Line Access Multiplexer (W-DSLAM or a "radio head") module 102. A high-speed common carrier network 104 is connected from one of its Asynchronous Transfer Mode ATM switches 106 to the W-DSLAM module 102 over a high-speed wireless link (aggregate path) 108. The aggregate throughput provided via the wireless link 108 is approximately 40.0 Mbps. The W-DSLAM 102 functions to multiplex this aggregate throughput into a plurality of wireless distribution channels 110. Each wireless distribution channel 110 is capable of providing a throughput of between (approximately) 384 Kbps and (approximately) 2 Mbps. At these operating throughput rates, the W-DSLAM 102 is capable of concentrating a substantial number of channels into the single high speed wireless aggregate path link 108. Although only one W-DSLAM module 102 is illustrated it will be understood that multiple arrangements 100 may be connected to the common carrier network 104, and further that multiple W-DSLAM modules may be interconnected with each other in a tree or ring topology within the context of the present invention. Each of the wireless distribution channels 110 is terminated at one or more network termination (NT) nodes or modules 112, each of which being provided at a user's (or subscriber's) home, office, business, or any other facility. The network termination module 112 may further operate in a multiplexing fashion to allow plural devices (D) 114, each requiring a portion of the bandwidth provided by the wireless distribution channel 110, to be connected for communication. Examples of such devices 114 include: a computer, a telephone, home appliances, office devices, and microprocessor controlled components and the like.

The high-speed common carrier network 104 is provided as a Synchronous Optical Network (SONET) or related Synchronous Digital Hierarchy (SDH) ring 120 formed from a plurality of cable interconnected ATM Add/Drop Multiplexers (ADM) 122. Other network elements, such as a server 124, routers 126, and ATM switches 106 are interconnected to the ring 120. The ATM switches 106 connecting with the W-DSLAM 102 over the link 108 comprises a point of presence (POP) node for providing wireless local loop arrangement 100 access to the common carrier network 104. This POP ATM switch 106 is preferably connected to one of the ring ATM/ADM modules 122 via a high-speed link 130 capable of throughput in the order of several hundred megabits per second. As one example, the high-speed link 130 may be implemented to transport an Optical Carrier 12 (OC-12) optical signal with a throughput of around 622.080 Mbps.

The multi-user shareable wireless local loop distribution channels 110 may advantageously utilize Digital Subscriber Line (DSL) modem technology to support transmission operating rates that are capable of delivering a host of broadband applications such as multimedia, video-teleconferencing, video-on-demand, games-on-demand, and the like. Preferably, a suitable Time Division Multiple Access (TDMA) or Code Division Multiple Access (CDMA) scheme may be utilized for the air interface required for implementing these point to multi-point distribution channels 110. Further, the air interface may be provided in accordance with standard protocols such as ANSI-136 or GSM, using a common carrier signal, for example, a 200 KHz (for a 384 Kbps data rate) or 1.6 MHz (for data rates up to 2 Mbps) signal.

A network management system database 134 is connected to the W-DSLAM module 102 via a communications link 136 that may comprise a network connection. The database 134 maintains data concerning not only users and their services but also the configuration of the wireless local loop arrangement 100 and network 104. The database 134 further performs some active management functions concerning ensuring proper operation and configuration of the wireless local loop arrangement 100 and network 104 by monitoring performance and providing dynamic response thereto.

SUMMARY OF THE INVENTION

A plurality of terminal nodes each capable of handling for a given user a plurality of sessions are connected to a multiplexer node operable to aggregate that session traffic onto an aggregate communications link. This connection is made over a shared point to multi-point communications link from the multiplexer node to the plurality of terminal nodes. Regulation of user and session access to the shared communications link is effectuated by a session dispatcher functionality. That functionality includes a dispatcher for each terminal that operates responsive to a received command to regulate session traffic access to the shared communications link. A proxy agent for the functionality at the multiplexer node operates responsive to configuration data to determine (a) which terminal nodes and (b) which sessions being handled thereby are to be granted access rights to the shared communications link and issue the necessary commands to the dispatcher to implement that determined allocation.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 2:
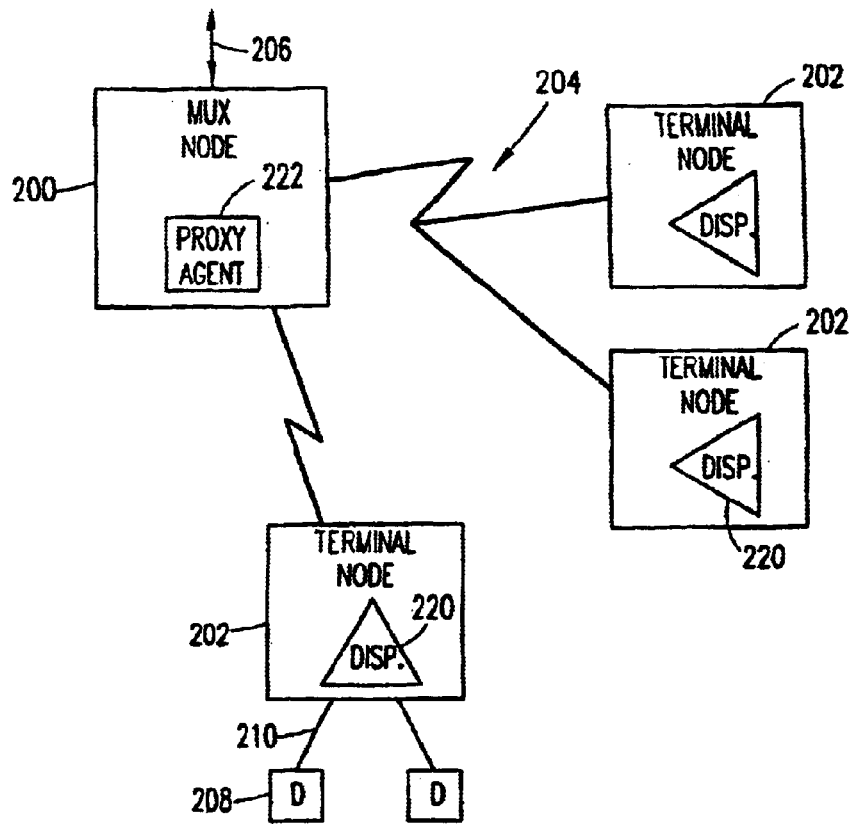
FIG. 2 is a block diagram of a session dispatcher functionality for use in the arrangement of FIG. 1.

Reference is now made to FIG. 2 wherein there is shown a block diagram of a session dispatcher functionality in accordance with the present invention. A multiplexer node 200 is interconnected with a plurality of terminal nodes 202 via a plurality of shareable point to multi-point wireless links 204 (not necessarily the same in number as the number of terminal nodes). The multiplexer node 200 operates to multiplex terminal node 202 session traffic carried over the plurality of Links 204 onto an aggregate link 206. A reverse operation to distribute aggregate link 206 traffic into the plurality of wireless links 204 is also performed. Each of the terminal nodes 202 may also perform a multiplexing operation to aggregate the session traffic of one or more devices 208 that are connected thereto via communications links 210 onto its wireless link 204 connection with the multiplexer node 200. Again, a reverse operation is performed to distribute the wireless link 204 traffic into the plurality of communications links 210 connecting the terminal node 202 to its devices 208.

Figure 1:
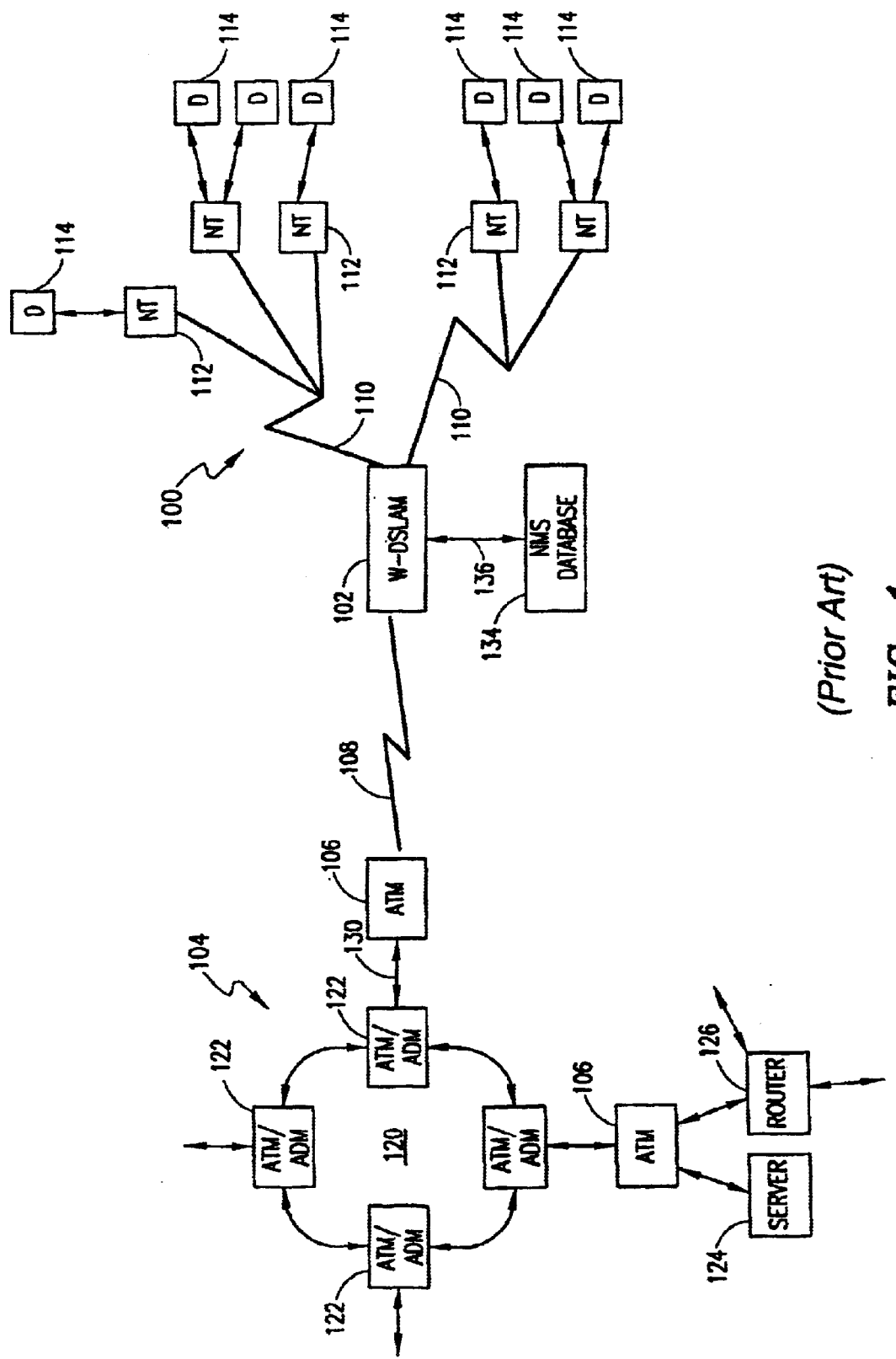
FIG. 1 (previously described) is a functional block diagram of an exemplary wireless local loop arrangement using a wireless Digital Subscriber Line Access Multiplexer (W-DSLAM) module in tree topology configuration.

The session dispatcher functionality may be used in the wireless local loop arrangement illustrated in FIG. 1 as well as in other arrangements wherein a multiplexer node and terminal node are interconnected using a shared, limited bandwidth communications link. The multiplexer node 200 may accordingly comprise, for example, a wireless Digital Subscriber Line Access Multiplexer (W-DSLAM or a "radio head" or an access router) module 102 like that shown in FIG. 1 (or a conventional DSLAM module supporting a wireless terminal node connection if desired). The terminal node 202 may comprise, for example, a network termination (NT) node or module 112 like that shown in FIG. 1 that is provided at a user's (or subscriber's) home, office, business, or any other facility. The wireless link 204 may comprise, for example, a point to multi-point wireless distribution channel 110 like that shown in FIG. 1 capable providing a throughput of between (approximately) 384 Kbps and (approximately) 2 Mbps that supports multiple sessions for a plurality of users. In this regard, it is recognized that one 2 Mbps path comprises a point to multi-point path that may, if desired, be shared among a plurality of users (for example, twenty-five users based on simulation results), with that path further supporting plural user session communications. As an alternative, the link could comprise a shared non-wireless link managed in a similar fashion if desired. The aggregate link 206 may comprise, for example, a high-speed wireless link (aggregate path) 108 like that shown in FIG. 1 providing an aggregate throughput of approximately 40.0 Mbps (or a wireline or optical cable link of like throughput). The devices 208 may comprise, for example, the user devices 114 of FIG. 1 such as: a computer, a telephone, home appliances, office devices, and microprocessor controlled components and the like. The communications links 210 may comprise, for example, conventional telephone links, and preferably support multi-session, advanced subscriber line voice and data services such as those provided through digital subscriber line (DSL) technology or cable modems.

Figure 3:
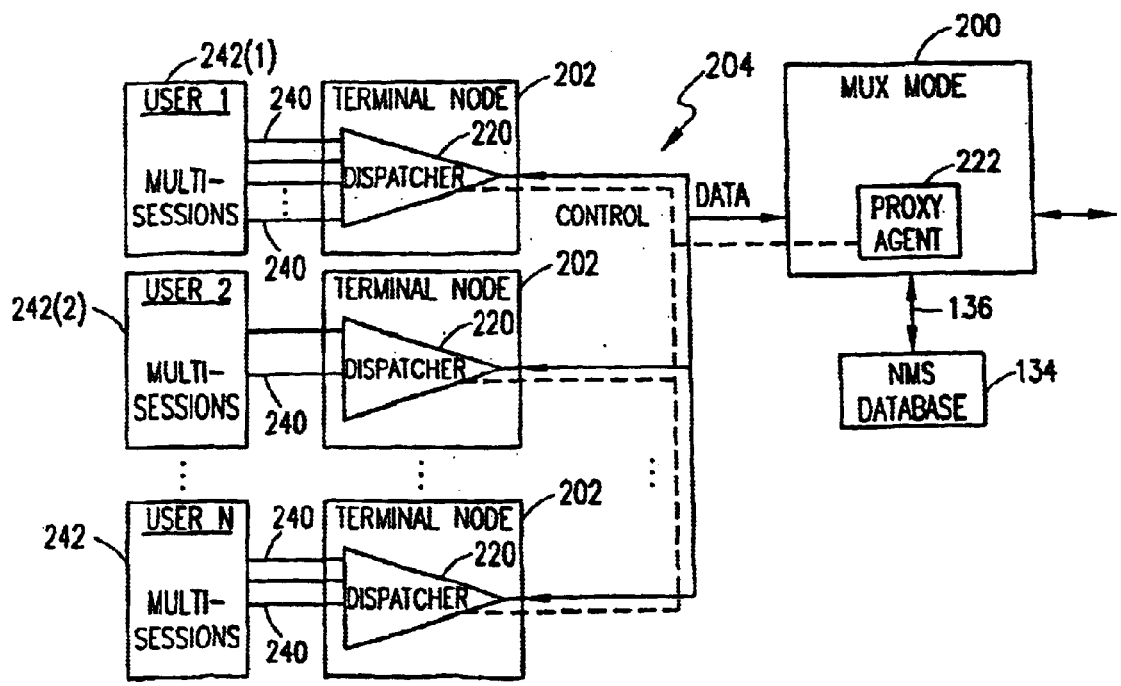
FIG. 3 is a logical diagram relating to the interconnection of multiple dispatchers to a proxy agent for the purpose of controlling multi-session, multi-user access to a restricted bandwidth communications link.

The session dispatcher functionality of the present invention comprises a dispatcher 220 at each terminal node 202 interconnected with a proxy agent 222 at the multiplexer node 200, with this configuration provided for each shared wireless link 204. The dispatcher 220 operates responsive to proxy agent 222 command to control the existence and number of user sessions that are allowed to consume (i.e., utilize) all or part of the available bandwidth (for example, 2 Mbps) on the shared wireless link 204. This may be better understood by reference to FIG. 3 wherein a plurality of dispatchers 220, one per terminal node 202, each operate to control the session(s) 240 that are made available to a user 242 for its devices 208, and further regulate which of the user 242 sessions 240 is given communications access to the shared point to multi-point wireless link 204. This is all accomplished under the direction and control of the proxy agent 222 which handshakes with each of the dispatchers 220 to collect session 240 information and send commands instructing the dispatchers on which one or more of the handled sessions for the multiple supported users 242 is granted communications rights over the shared wireless link 204. A logical (or physical) control channel (schematically shown as a dashed line) on the shared wireless link 204 between each terminal node 202 and multiplexer node 200 is used to support communications for this handshaking operation and thus allow the proxy agent 222 to communicate with its connected/associated dispatchers 220.

Operation of the session dispatcher functionality may be better understood through consideration of an exemplary handling of multi-user, multi-session traffic. Consider then a scenario where user 242(1) and user 242(2) are sharing use of the same wireless link 204 from their respective terminal nodes 202 to the multiplexer node 200. In many cases, the bandwidth demands of the multiple session 240 traffic for each user 242 will be within the bandwidth limitation (for example, 2 Mbps) of the wireless link 204 and thus each user with all of their sessions may be accommodated. At another instant in time, however, the combined bandwidth needs of both users may exceed the bandwidth limitation of the link. This is where the benefits of the session dispatcher functionality are best realized as the functionality operates to exercise control over and regulation of user/session access to the shared wireless link 204.

The multiplexer node 200, through its proxy agent 222, possesses knowledge of the topological configuration of the interconnection with the users 242 (including the bandwidth limitations of the shared wireless link 204), as well as information concerning the service profiles of each user and the current communications needs of the users and their sessions 240. This information may be obtained from the network management system database 134 as well as from the terminal nodes 202 as needed. The service profile data is evaluated in context with the user 242 and session 240 communications needs and the topological configuration to determine which of the users and sessions that are competing for bandwidth on the shared wireless link 204 should be granted access. Once that determination is made, the proxy agent 222 communicates with each dispatcher 220 in the handshaking operation to provide instructions on how the dispatcher 220 within each terminal node 202 should operate to control user/session access to the shared wireless link 204 (i.e., to make an appropriate resource allocation).

As an example, if user 242(1) has paid for a higher class of service than the user 242(2), user 242(1) will be given priority over user 242 (2) for access at those instances where the bandwidth limitations of the shared wireless link 204 force the proxy agent to regulate/restrict access. To implement this, the handshaking operation with the terminal node 202 of user 242(1) will effectively grant user/session access, while the handshaking operation with the terminal node of user 242(2), on the other hand, will deny or restrict user/session access, such that in the aggregate the shared wireless link 204 is not overloaded. Once the needs of the priority user 242(1) are accommodated, the proxy agent may thereafter reconfigure the allocation of communications rights over the shared wireless communications link 204.

In this regard, the operational goal of the session dispatcher functionality may be seen to be selectively dividing the limited amount of bandwidth available on the shared wireless link among and between the multi-users and their multi-sessions in accordance with an allocation determined through evaluation of a number of factors (like service profile data, user and session communications needs and topological configuration information).

Taken to an extreme, the proxy agent may at a given time, and in view of service profile data, user 242 and session 240 communications needs and topological configuration information, effectively block a user and its session traffic for a temporary period of time from having any access rights to the shared wireless link 204. In this scenario, the entire available bandwidth of the shared wireless link 204 could be essentially allocated to a single user.

As another example, consider again multiple users each having multiple sessions, but wherein the sessions include communications that have time sensitive data delivery requirements. As the number of users increases, the number of sessions increases, or the bandwidth demands of one or more sessions increases, it will become necessary for the proxy agent to actively step in and regulate (i.e., reconfigure) access rights to the shared wireless link 204. In this case, the time sensitivity of the user and session communications needs is given some preference, with consideration also being given to service profile data and topological configuration information. In regulating user and session access to the link, the proxy agent may instruct the dispatchers to give priority to the handled sessions implicating time sensitive communications (like voice calls) while restricting non-time sensitive session communication access until such time as the load on the shared wireless link is reduced.

Figure 4:
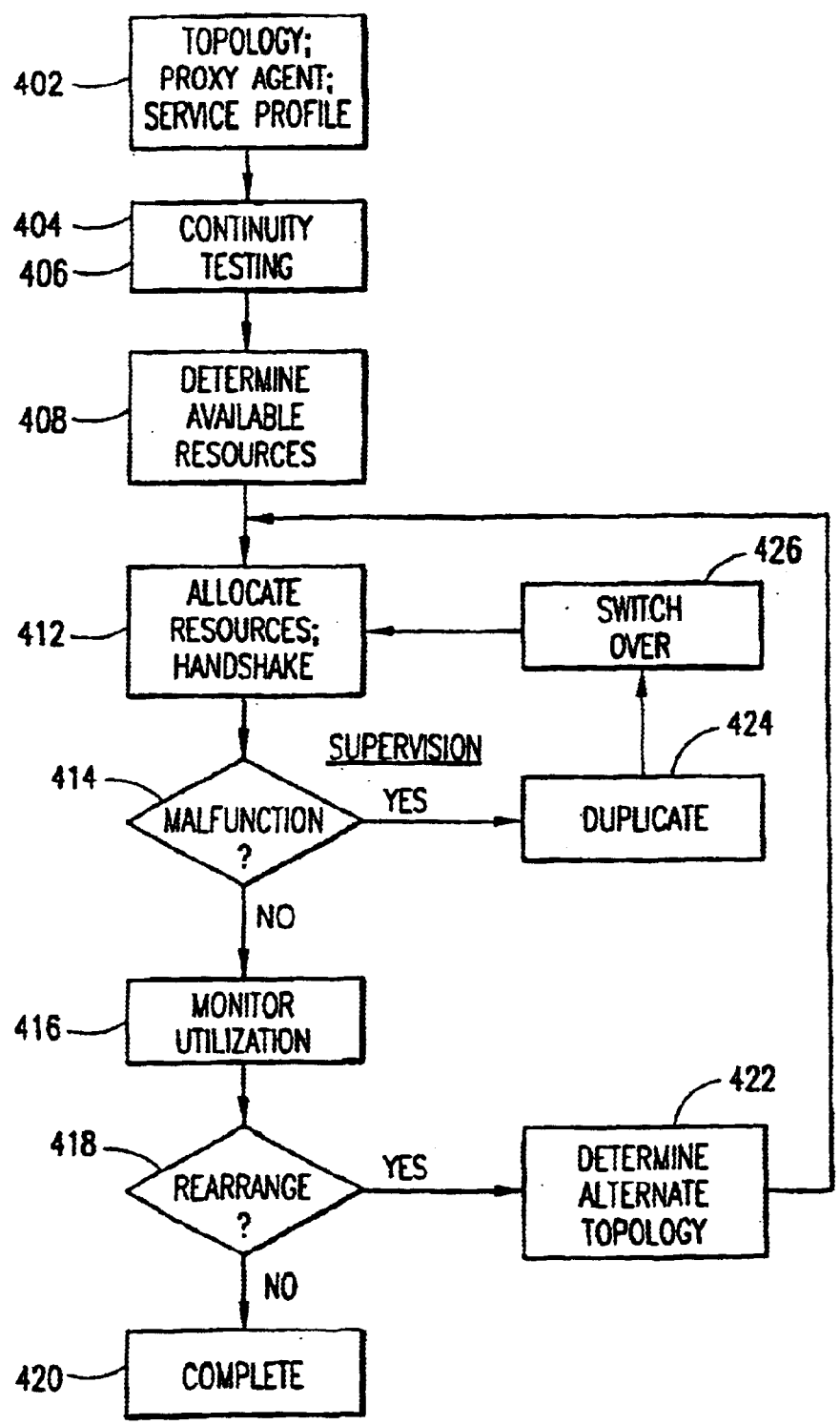
FIG. 4 is a flow diagram illustrating a procedure for resource allocation operation implicating a session dispatcher functionality.

Reference is now made to FIG. 4 wherein there is shown a flow diagram illustrating a procedure for session dispatcher functionality operation. In step 402, the multiplexer node 200 determines from the network management system database 134 that it is part of a particular access network portion, and on a specific branch having a particular aggregate bandwidth (i.e., the topology of the interconnections is recognized along with the bandwidth limitations of those interconnections). It further downloads proxy agent 222 data from the network management system database 134 relating to the self-configuration specifications of the multiplexer nodes 200, an identification of the subscribers allocated to each of those nodes, and a program sequence representing a fallback resource algorithm. This information is useful for start-up configuration of the system, to properly identify which subscribers to support through each node 200, and to allow algorithmic implementation of resources as needed (as will be described in more detail below). It also obtains from the network management system database 134 the service profile for each user 242 (it being understood that each such profile is associated with a terminal node 202). Subsequent resource allocation in connection with the present invention is preferably performed by using a multi-protocol label switching (MPLS) scheme such as, for example, an appropriately configured label distribution protocol (LDP). Thus, the determination of step 402 is performed at least in conjunction with the initial discovery of label switched routers (LSRs) in accordance with the LDP discovery mechanism. The multiplexer node 200 then executes a continuity test in steps 404 and 406 on both its aggregate side (i.e., the side concerning communication over the aggregation link 206) as well as its distribution side (i.e., the side concerning the one or more shared wireless links 204), respectively, by sending test patterns on a dedicated test virtual circuit (VC). A determination is then made by the multiplexer node 200 in step 408 with respect to what are the available resources on both the aggregate side and the distribution side. The resource types typically include bandwidth availability and/or requirements, and quality of service (QoS) parameters such as end-to-end packet delay, jitter, loss, and throughput utilization. This operation, generally speaking, identifies from the topology data and the continuity testing what the communications system is physically capable of supporting. The available resources as determined in step 408 are then allocated in step 412 by using the Extended LDP procedures and messages propagated among the concerned nodes that are now connected in appropriate LSPs. With respect to the session dispatcher functionality, the proxy agent 222 determines which users 242 need service and which one or more of the handled sessions 240 for the multiple supported users is to be granted communications rights over the shared wireless link 204. The handshaking process is then performed between the proxy agent 222 and the dispatcher 220 to communicate the resource allocation commands for enabling multi-user, multi-session access to the shared wireless link 204 in accordance with the determined allocations. Still further in step 412, resource supervision by the network management system database 134 is maintained, preferably as a background process, in conjunction with appropriate LDP control. If a malfunction condition is found on any LSP (as determined in decision block 414), that particular LSP is preferably duplicated in step 424 by using the redundancy in the same multiplexer node or by using one or more separate multiplexer nodes together. Additional topological combinations may also be utilized for determining duplicate paths. Once a duplicate LSP is established, a switch over is effectuated with graceful degradation. In other words, the malfunctioning session continues to be maintained while the duplicate LSP is established and substituted for the malfunctioning LSP in step 426. Thereafter, resources are allocated using the newly-configured LSP paths, as per step 412 set forth above. Again, appropriate handshaking may be performed to implement these allocations. On the other hand, if there was no malfunctioning of any LSPs, the resource allocation method of the present invention proceeds to monitor in step 416 a resource utilization counter preferably associated with the multiplexing node (and its proxy agent) in order to verify that the throughput on the distribution side (i.e., the wireless link 204) is at least in substantial accordance with the downloaded service subscription profiles of the user as well as other related performance criteria. Based on the monitoring of the utilization counter, a determination is made in decision block 418 to verify if the connection paths among the multiplexer node and the terminal nodes need to be topologically rearranged. If so, an alternate topology is calculated at the network management system database 134 where the resource allocation and supervision are once again determined, as provided in step 412. Again, handshaking operations to implement any such rearrangement are performed to configure shared multi-user, multi-session access to the wireless link 204. If no topological re-arrangement is needed, the resource allocation sessions on the established LSPs are maintained until completion (step 420).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A wireless local loop communications system, comprising:

a digital subscriber line access multiplexer;

a plurality of network terminals associated with the digital subscriber line access multiplexer, each network terminal providing multi-session local loop access for user communications;

a shared point to multi-point wireless communications link connecting the digital subscriber line access multiplexer to the plurality of network terminals; and a session dispatcher functionality, comprising:

a dispatcher for each network terminal operating responsive to received commands to regulate user and session access to the shared wireless communications link; and a proxy agent for the access multiplexer operating responsive to configuration data to determine (a) which network terminal and (b) which sessions being handled thereby are to be granted access rights to the shared communications link and issue commands to the dispatcher to implement the determined access rights.

2. The system as in claim 1 further including an interface from the access multiplexer to a common carrier network.

3. The system as in claim 2 wherein the common carrier network comprises a plurality of asynchronous transfer mode (ATM)add/drop multiplexing (ADM) switches interconnected in a ring topology and the interface comprises an ATM switch interconnecting a gateway one of the digital subscriber line access multiplexers to one of the ATM/ADM switches.

4. The system as in claim 1 wherein the configuration data includes user communications service subscription information concerning level of service, the proxy agent operating to evaluate the service subscriptions of each user competing for access to the shared communications link and granting access rights is accordance with subscripted to levels of service.

5. The system as in claim 1 wherein the configuration data includes service need for each user and its sessions, the proxy agent operating to evaluate the service needs of each user competing for access to the shared communications link and granting access rights in accordance with those needs.

6. The system as in claim 1 wherein the shared wireless communications link includes a control channel for carrying the commands issued from the proxy agent to each of the dispatchers for regulating session traffic access to the shared communications link.

* * * * *